United States Patent
Takaku

(10) Patent No.: US 7,621,174 B2
(45) Date of Patent: Nov. 24, 2009

(54) DEVICE FOR DETECTING CETANE VALUE OF FUEL USED BY AN ENGINE

(75) Inventor: Asami Takaku, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 305 days.

(21) Appl. No.: 11/713,265

(22) Filed: Mar. 2, 2007

(65) Prior Publication Data

US 2007/0204674 A1 Sep. 6, 2007

(30) Foreign Application Priority Data

Mar. 3, 2006 (JP) ............................. 2006-057521

(51) Int. Cl.
*G01M 15/00* (2006.01)
(52) U.S. Cl. ................ 73/114.53; 73/114.38
(58) Field of Classification Search ............. 73/114.13, 73/114.14, 114.15, 114.16, 114.24, 114.25, 73/114.38, 114.52, 114.53, 114.55
See application file for complete search history.

(56) References Cited

U.S. PATENT DOCUMENTS

| 5,457,985 | A | 10/1995 | Cellier et al. | |
|---|---|---|---|---|
| 7,246,596 | B2 * | 7/2007 | Yamaguchi et al. | 123/299 |
| 7,322,341 | B2 * | 1/2008 | Yamaguchi et al. | 123/435 |
| 7,360,525 | B2 * | 4/2008 | Yamaguchi et al. | 123/478 |
| 7,367,223 | B2 * | 5/2008 | Kettl et al. | 73/53.05 |
| 7,401,591 | B2 * | 7/2008 | Yamaguchi et al. | 123/299 |
| 2004/0154386 | A1 * | 8/2004 | Shinzawa | 73/118.1 |
| 2007/0079647 | A1 * | 4/2007 | Aoyama | 73/35.02 |
| 2007/0151542 | A1 * | 7/2007 | Yamaguchi et al. | 123/299 |

FOREIGN PATENT DOCUMENTS

| EP | 0610118 | 8/1994 |
|---|---|---|
| EP | 1793110 | 6/2007 |
| JP | 2004340026 | 12/2004 |
| WO | WO-2005119034 | 12/2005 |

OTHER PUBLICATIONS

European Search Report No. 07103245.2-1263 dated Jun. 21, 2007.

\* cited by examiner

*Primary Examiner*—Eric S McCall
(74) *Attorney, Agent, or Firm*—Global IP Counselors, LLP

(57) ABSTRACT

A fuel cetane determination device for an engine is disclosed. In one embodiment, the device comprises a controller that is arranged and configured to determine a rapidness of combustion based on a parameter relating to a combustion state of an engine. The controller is further arranged and configured to determine the cetane value of the fuel in use by the engine based on the rapidness of combustion from a correlation between the rapidness of combustion and the cetane value when the engine is in a first operating condition. The controller is further arranged and configured to determine the cetane value of the fuel in use by the engine based on the rapidness of combustion from a correlation between the rapidness of combustion and the cetane value when the engine is in a second operating condition. The correlation for the second operating condition has a different characteristic tendency from the correlation for the first operating condition. A method is also disclosed.

20 Claims, 14 Drawing Sheets

DEVICE FOR DETECTING CETANE VALUE OF FUEL USED BY AN ENGINE

CROSS-REFERENCE TO RELATED APPLICATIONS

This application claims priority from Japanese Patent Application Serial No. 2006-057521 filed Mar. 3, 2006, the disclosure of which, including its specification, drawings and claims, are incorporated herein by reference in its entirety.

TECHNICAL FIELD

The present disclosure pertains to a technology for an accurate determination of the cetane value of a fuel used by an engine, such as, for example, a diesel engine.

BACKGROUND

As a conventional technology for determining the cetane value, Published Japanese Patent Application No. 2004-340026 discloses that a correlation of a cetane value of a fuel with a force on the piston due to combustion of an engine. In this arrangement, the cetane value is determined by using correlation data that is obtained in advance.

Although the correlation between the cetane value and the force on the piston due to combustion of the engine (hereinafter "piston force") is discussed in Japanese Patent Application No. 2004-340026, in reality, the correlation between the cetane value and the piston force varies significantly based on the operating condition of the engine. For example, the correlation under a low load condition, such as during idling, is different as compared to correlation under an intermediate/high load condition. Thus, the arrangement disclosed in Japanese Patent Application No. 2004-340026 may not correctly determine the cetane value under all conditions. In fact, the cetane value will be dependent upon the operating condition under which detection is carried out.

Accordingly, there exists a need for a device that may accurately determine the cetane value of a fuel used by a diesel engine based on a correlation between the cetane value and a combustion status which is suitable for a given operating condition.

SUMMARY

A fuel cetane determination device for an engine is disclosed. In one embodiment, the device comprises a controller that is arranged and configured to determine a rapidness of combustion based on a parameter relating to a combustion state of an engine. The rapidness of combustion includes the meaning of steepness, acceleration or suddenness of combustion. The controller is further arranged and configured to determine the cetane value of the fuel in use by the engine based on the rapidness of combustion from a correlation between the rapidness of combustion and the cetane value when the engine is in a first operating condition. The controller is further arranged and configured to determine the cetane value of the fuel in use by the engine based on the rapidness of combustion from a correlation between the rapidness of combustion and the cetane value when the engine is in a second operating condition. The correlation for the second operating condition has a different characteristic tendency from the correlation for the first operating condition. A method is also disclosed.

Because the cetane value is obtained using different characteristic correlations between the cetane value and the rapidness of combustion when operating under the first operating condition and when operating under the second operating condition, the cetane value can be detected correctly according to a given operating condition.

BRIEF DESCRIPTION OF DRAWINGS

Other features and advantages of the present system will be apparent from the ensuing description, taken in conjunction with the accompanying drawings, in which.

DETAILED DESCRIPTION

Figure 1:
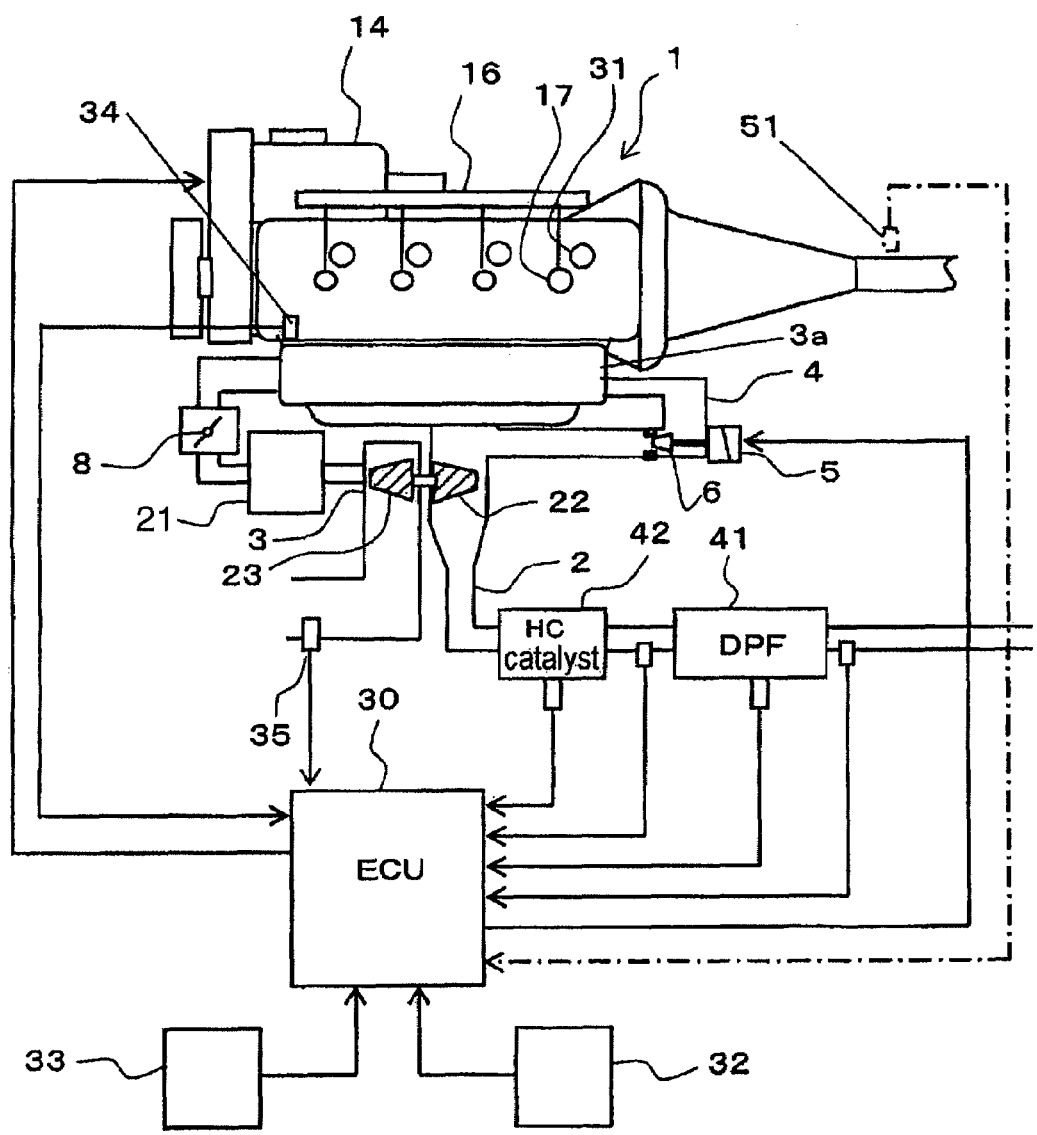
FIG. 1 is a system configuration diagram of a diesel engine that is common to the respective embodiments disclosed herein.

While the claims are not limited to the illustrated embodiments, an appreciation of various aspects of the system is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

A diesel engine 1 has an exhaust passage 2 and an intake passage 3 with a collector 3a. An EGR passage 4 connects the exhaust passage 2 to the collector 3a of the intake passage 3. An EGR valve 6 is disposed in the EGR passage 4 and is operatively connected to an engine controller or control unit 30. The valve opening degree of the EGR valve 6 may be continuously and variably controlled by a stepping motor 5 in response to a control signal from the engine controller 30 to obtain a predetermined EGR rate suitable for a given operating condition.

The engine 1 is also equipped with a common rail fuel injection device. In the common rail fuel injection device, after fuel from a fuel tank (not shown) is pressurized by a high pressure fuel pump 14, the fuel is fed through a high pressure fuel supply passage such that the fuel accumulates in a common rail 16 (accumulator). The pressurized fuel is then distributed from this common rail 16 to a plurality of fuel injection nozzles 17 provided for each of the engine cylinders.

The control unit 30 is configured to control the opening and closing of the nozzles of each of the fuel injection nozzles 17 to inject fuel into the engine cylinders. Each fuel injection nozzle 17 has a needle valve that is magnetically driven by a solenoid. While the needle valve remains seated on a valve seat when the solenoid is turned OFF, the needle valve is lifted to inject fuel through an injection hole provided at the nozzle tip when the solenoid is turned ON. The start timing of fuel injection may be controlled by switching the solenoid from OFF to ON, and the fuel injection amount Q may be continuously and variably regulated by controlling the duration of the ON state of the solenoid. The fuel injection amount will increase as the duration of the ON state of the solenoid is controlled longer when the fuel pressure in the common rail 16 is maintained same. In this common rail fuel injection device, two fuel injections can be performed per cycle, where the required amount of fuel is divided and injected with a pilot or first fuel injection and a main or second fuel injection. Typically, the pilot fuel injection is a small quantity injection and is performed during the compression stroke before the main fuel injection.

The engine 1 has a variable-capacity turbo feeder 21 equipped with a coaxial arranged exhaust turbine 22 and a compressor 23. The exhaust turbine 22 is positioned in the exhaust passage 2 at a position downstream of a portion where the EGR passage 4 connects to the exhaust passage 2. The exhaust turbine 22 converts the thermal energy of exhaust gas into rotational energy so the compressor 23 in the intake passage 3 may compress the intake air sucked into the cylinder. Although it is not illustrated, the turbo supercharger 21 is preferably provided with a variable nozzle arranged at a scroll inlet of the exhaust turbine 22. The variable nozzle is operatively connected to the control until 30 via an actuator to achieve desirable supercharging from a low engine rotation region. Specifically, a capacity of the turbo supercharger 21 can be varied depending on the engine operation conditions. A relatively small capacity of the turbo supercharger 21 is preferably achieved by reducing an opening degree of the variable nozzle when the exhaust gas flow rate is relatively small (such as a low speed region). Conversely, a relatively large capacity is preferably achieved by increasing the opening degree of the variable nozzle when the exhaust gas flow rate is relatively large (such as a high speed region).

The engine 1 preferably includes an intake throttle valve 8 at an inlet portion of the collector 3a of the intake passage 3 such that the intake air quantity sucked into the cylinders are regulated by an actuator (not shown) in response to a control signal from the control unit 30.

The control unit 30 is also configured and arranged to receive detection signals from a combustion pressure sensor 31 for detecting pressure P inside the combustion chamber of a specific cylinder, an accelerator position sensor 32 for detecting a depression amount of an accelerator pedal, a crank angle sensor 33 for detecting a rotational speed and crank angle θ of the engine, a temperature sensor 34 for detecting the engine coolant temperature, and an air flow meter 35 for detecting the amount of intake air. The control unit 30 is further configured and arranged to perform the EGR ration, the supercharging pressure, and other components and functions of the engine 1. The EGR ratio and supercharging pressure are controlled together and regulated in cooperation such that optimum EGR ratio and supercharging pressure suited to a given operating condition are obtained based upon the detection signals described above.

The engine 1 is also equipped with an exhaust gas after-treatment system. In this exhaust gas after-treatment system, a diesel particulate filter (DPF) 41 is positioned in the exhaust passage 3. The diesel particulate filter 41 is equipped with a wall flow honeycomb structure and catalyst thereon for collecting and removing exhaust particulate matter (particulate matter or "PM") contained in the exhaust gas. The wall flow honeycomb structure having a solid-cylindrical filter material such as cordierite with a plurality of honeycomb-shaped, fine passages formed therein and the alternate ends of the passages are closed. When the PM accumulation amount in the diesel particulate filter 41 has reached the predetermined amount, the collected particulate matter will be combusted and removed by raising the exhaust gas temperature to regenerate the diesel particulate filter 41. In this operation, the exhaust gas temperature can be raised by changing the air-fuel ratio from a lean air-fuel ratio to a theoretical or rich air-fuel ratio.

The exhaust gas after-treatment system is also provided with an HC-trapping catalytic converter 42 that is positioned in the exhaust passage 3 at a position upstream of the diesel particulate filter 41. The HC trap catalytic converter 42 has an HC absorbing function when the temperature of exhaust gas is low, and an HC releasing function when the exhaust gas reaches a predetermined or higher temperature. The released HC will be oxidized and purified by the oxygen contained in the exhaust gas with the catalyst loaded on the HC trap catalytic converter 42. Moreover, once catalyst activation is completed, then the HC trap catalytic converter 42 functions as an oxidation catalyst as normal.

Next, a determination of the cetane value of the fuel according to a first embodiment will be explained according to the flow chart in FIG. 2.

Figure 9:
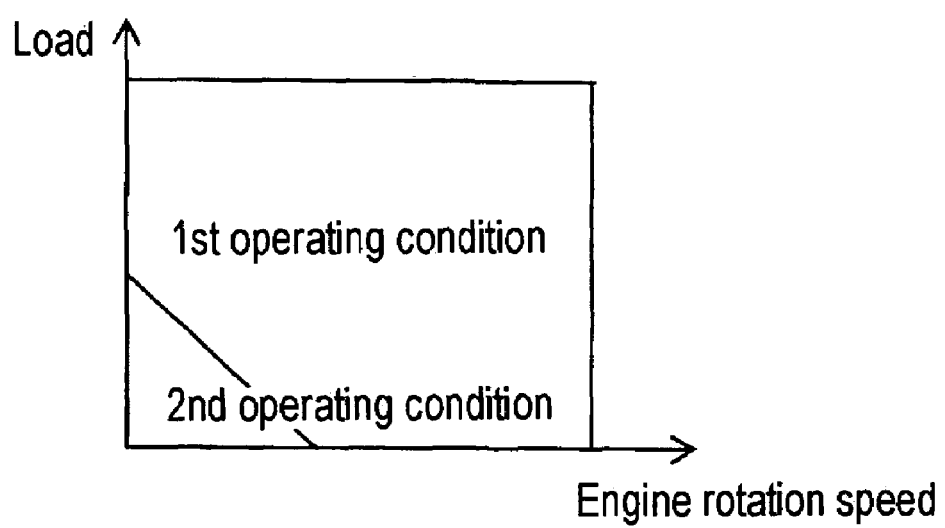
FIG. 9 is a graph illustrating the first and second operating conditions common to the respective embodiments.

In Step S101, when the engine 1 is operated in the first operating condition as shown in FIG. 9, the detected signals such as combustion pressure P, crank angle θ, and fuel injection amount Q, are inputted into the controller 30.

In Step S102, values such as a force on the piston due to combustion (hereinafter "piston force"), a pressure change ratio $dP/d\theta$, a derivative $d^2P/d\theta^2$ of the pressure change ratio, or a heat value change ratio $dQ/d\theta$ (where Q indicates the amount of heat released, and is represented by the amount of fuel injected), which are correlated with pressure P inside the combustion chamber, are computed based on the respective detected values from Step S101 as values that indicate the rapidness of combustion in order to detect their respective peak values. While the piston force, the pressure change ratio $dP/d\theta$, the derivative of the pressure change ratio $d^2P/d\theta^2$ and the heat value change ratio $dQ/d\theta$ are listed above as values that may be correlated with the pressure P inside the combustion chamber, it is understood that only one of such listed values are necessary for calculating the rapidness of combustion.

Figure 3:
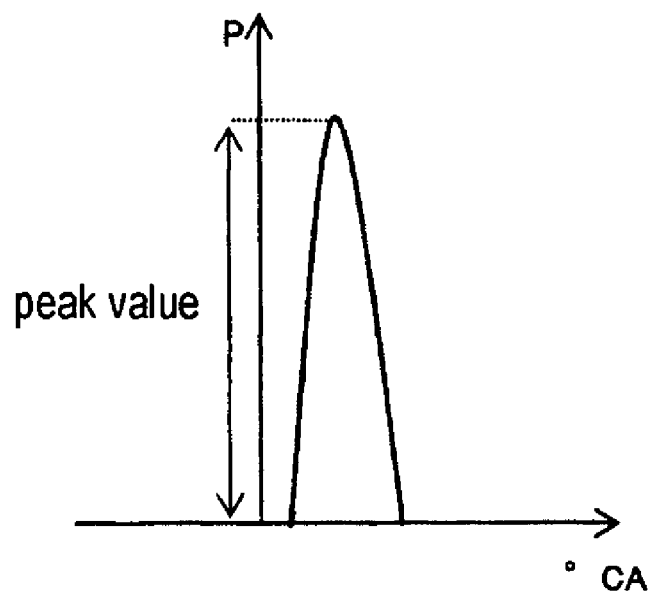
FIG. 3 is a graph illustrating the peak value of a combustion force that may be used in the first embodiment.
Figure 4:
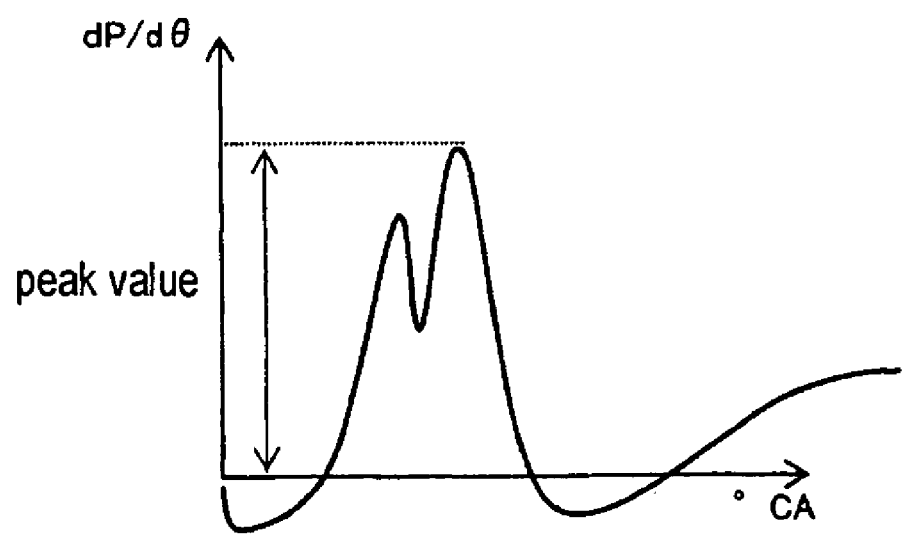
FIG. 4 is a graph illustrating the peak value of a value obtained by a pressure change ratio that may be used in the first embodiment.
Figure 5:
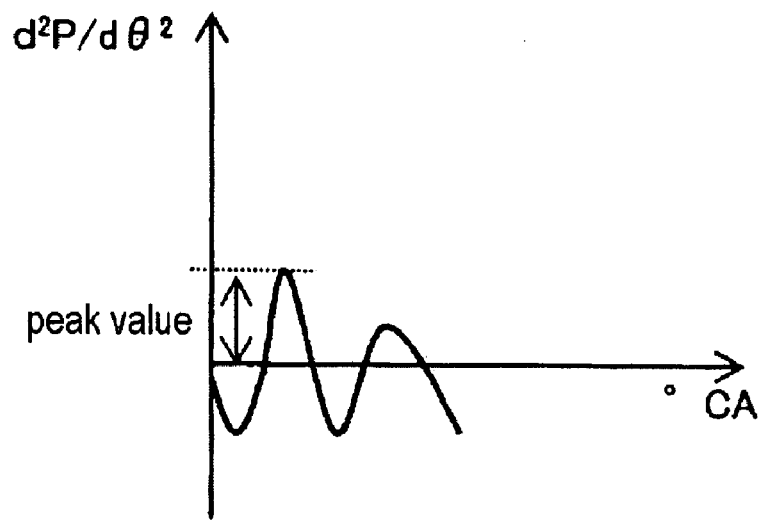
FIG. 5 is a graph illustrating the peak value of a value obtained by a derivative of the pressure change ratio that may be used in the first embodiment.
Figure 6:
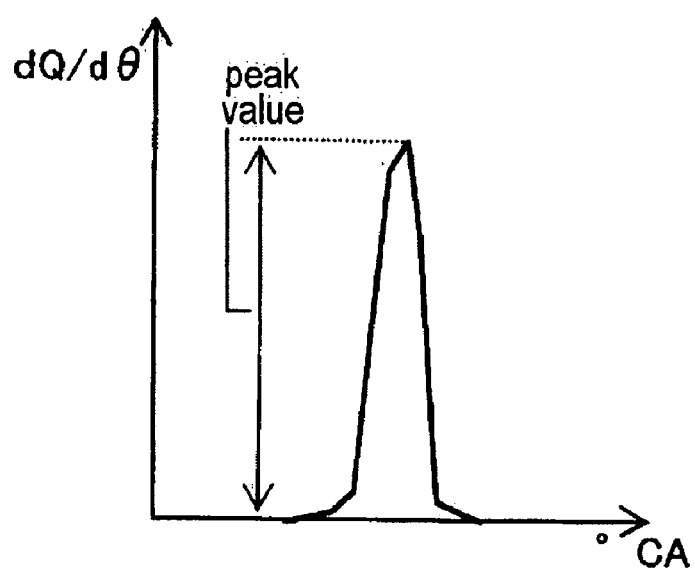
FIG. 6 is a graph illustrating the peak value of a heat value change ratio that may be used in the first embodiment.

FIGS. 3-6 are graphs showing the characteristics of the piston force, pressure change ratio, etc. More specifically, FIG. 3 illustrates the piston force. Here, when the piston force is used to determine the cetane value, a piston force sensor can be provided to detect the piston force. FIG. 4 illustrates the pressure change ratio $dP/d\theta$ waveform obtained by differentiating pressure P inside the combustion chamber once. FIG. 5 illustrates the derivative of the pressure change ratio $d^2P/d\theta^2$ obtained by differentiating pressure P inside the combustion chamber twice. FIG. 6 illustrates the peak value of the heat value change ratio $dQ/d\theta$ obtained by differentiating amount of the heat released (fuel injection amount) Q.

Figure 7:
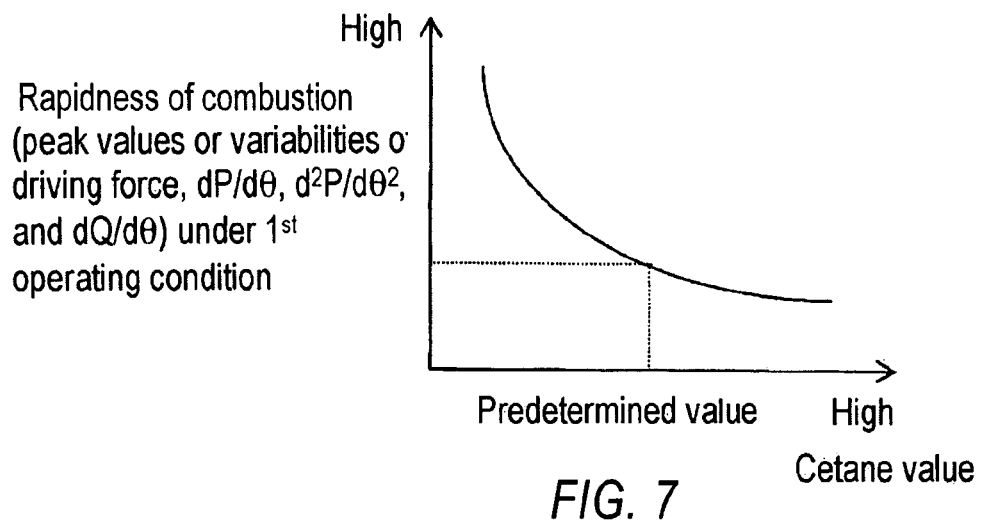
FIG. 7 is a graph illustrating the relationship between the cetane value and rapidness of combustion under a first operating condition that may be used in the first and the second embodiments.

In Step S103, the cetane value of the fuel is determined from any one of the respective peak values obtained in Step S102 based on the map shown in FIG. 7, which illustrates a correlation between the rapidness of combustion (determined for either the peak value of the piston force, pressure change ratio $dP/d\theta$, derivative $d^2P/d\theta^2$ of the pressure change rate, or heat value change ratio $dQ/d\theta$) and cetane value. Here, the correlation data characteristic is obtained under the first operating condition (at middle-high load or idling/low load/high engine rotational speed) shown in FIG. 9. Here, the cetane value decreases as the rapidness of combustion increases.

In Step S104, whether or not the cetane value detected in Step S103 is higher than a predetermined value is determined. In the embodiment illustrated, the predetermined cetane value is approximately 55. The process flow advances to Step S105 if the detected cetane value is 55 or higher, or the determination of the cetane value is ended if the cetane value found is lower than 55.

Figure 8:
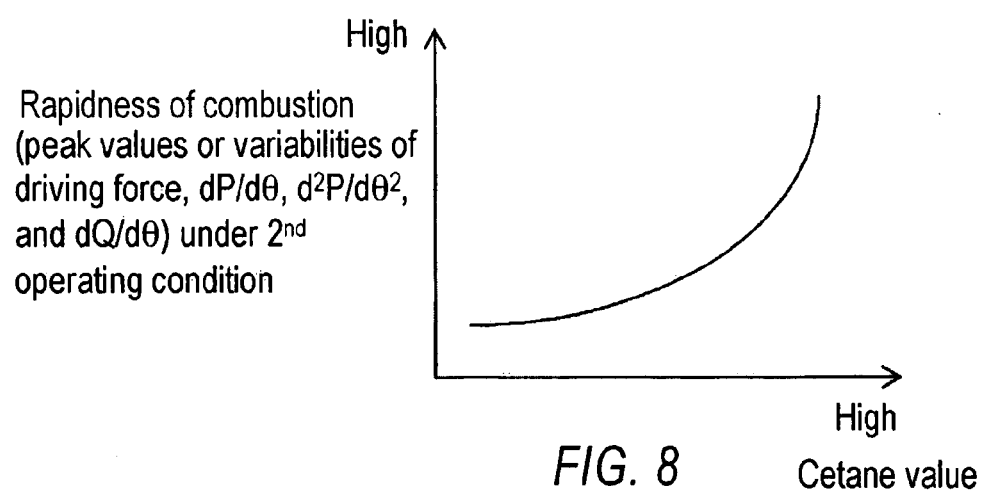
FIG. 8 is a graph illustrating the relationship between the cetane value and rapidness of combustion under a second operating condition that may be used in the first and the second embodiments.

In Step S105, after engine 1 is set to the second operating condition shown in FIG. 9, the cetane value is found based on the map shown in FIG. 8, which shows correlational data between the rapidness of combustion and the cetane value that is obtained in advance under the second operating condition shown in FIG. 9. Here, unlike the case under the first operating condition (at middle-high load or idling/low load/high engine rotational speed), the correlation data characteristic indicates that the cetane value increases as the rapidness of combustion increases. Determination of the cetane value is ended at this point.

Figure 2:
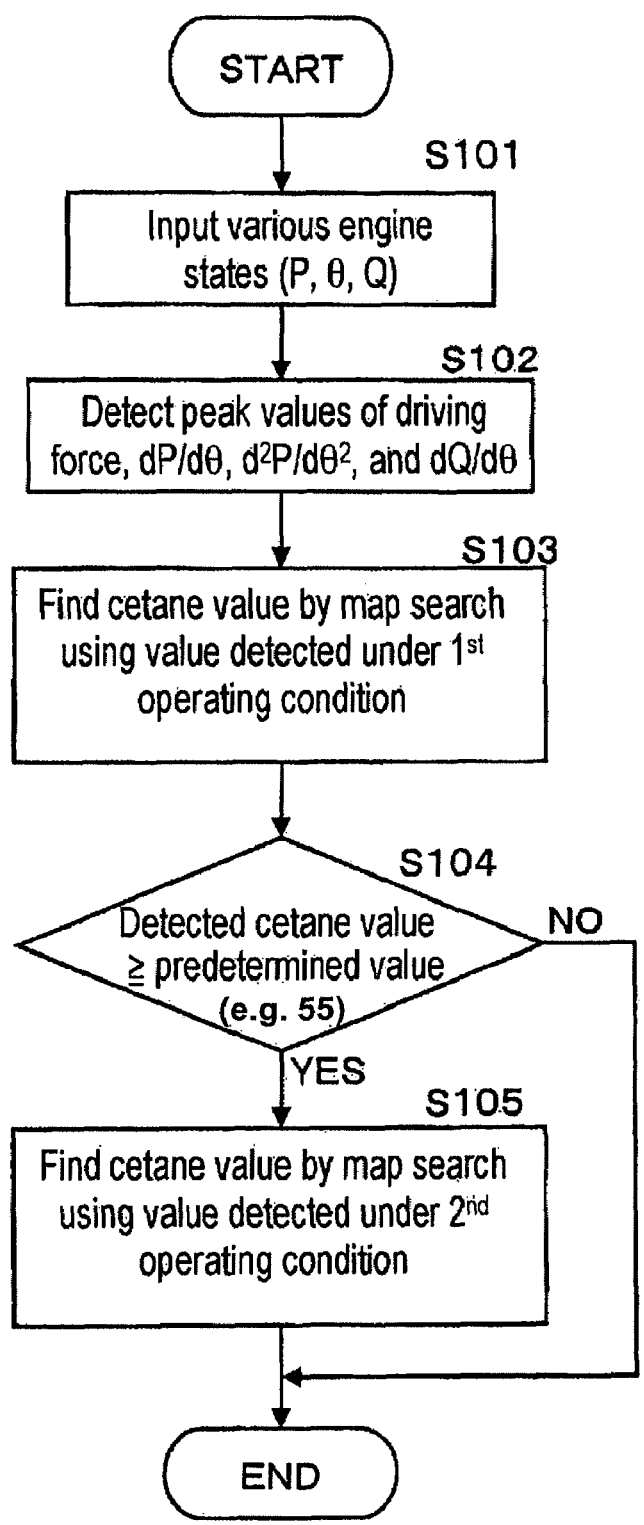
FIG. 2 is a flow chart illustrating a routine for determining the cetane value of fuel in a first embodiment.

Furthermore, according to the flowchart in FIG. 2, when the cetane value computed under the first operating condition is greater than the predetermined value, the cetane value is found by switching to the second operating condition. The reason is that, as shown in FIG. 7, if a high cetane value is generated under the first operating condition, the rapidness of combustion does not change significantly with respect to changes in cetane value, so that the cetane value cannot be detected accurately. As shown in FIG. 8, because the rapidness of combustion changes significantly with respect to changes in the cetane value under the second operating condition, the cetane value can be detected very accurately, even for high cetane values.

In addition, although the cetane value is computed first under the first operating condition in the present embodiment, it can be configured such that switching to the first operating condition is made when the cetane value computed under the second operating condition is lower than the predetermined value.

Furthermore, although the operating conditions are forcibly switched to compute the cetane value in the present embodiment, it can be configured such that operating conditions are identified first, and the cetane value is computed when the first operating condition and the second operating condition have been respectively met.

Although the pressure P inside the combustion chamber is detected as a combustion status parameter, and the peak value of either the piston force, pressure change ratio $dP/d\theta$, derivative pressure change ratio $d^2P/d\theta^2$, or heat value change ratio $dQ/d\theta$ computed from the detected value may be used as the rapidness of combustion in the aforementioned first embodiment, other engine characteristics may be used as the rapidness of combustion. For example, a peak value time periods of either the piston force, pressure change ratio $dP/d\theta$, derivative pressure change ratio $d^2P/d\theta^2$, or heat value change ratio $dQ/d\theta$ that is computed in the same manner as in the first embodiment may be used as the rapidness of combustion. Here, the phrase "peak value time period" is defined as the times the respective values take to reach their peaks, with a shorter time indicating a higher rapidness of combustion.

Figure 10:
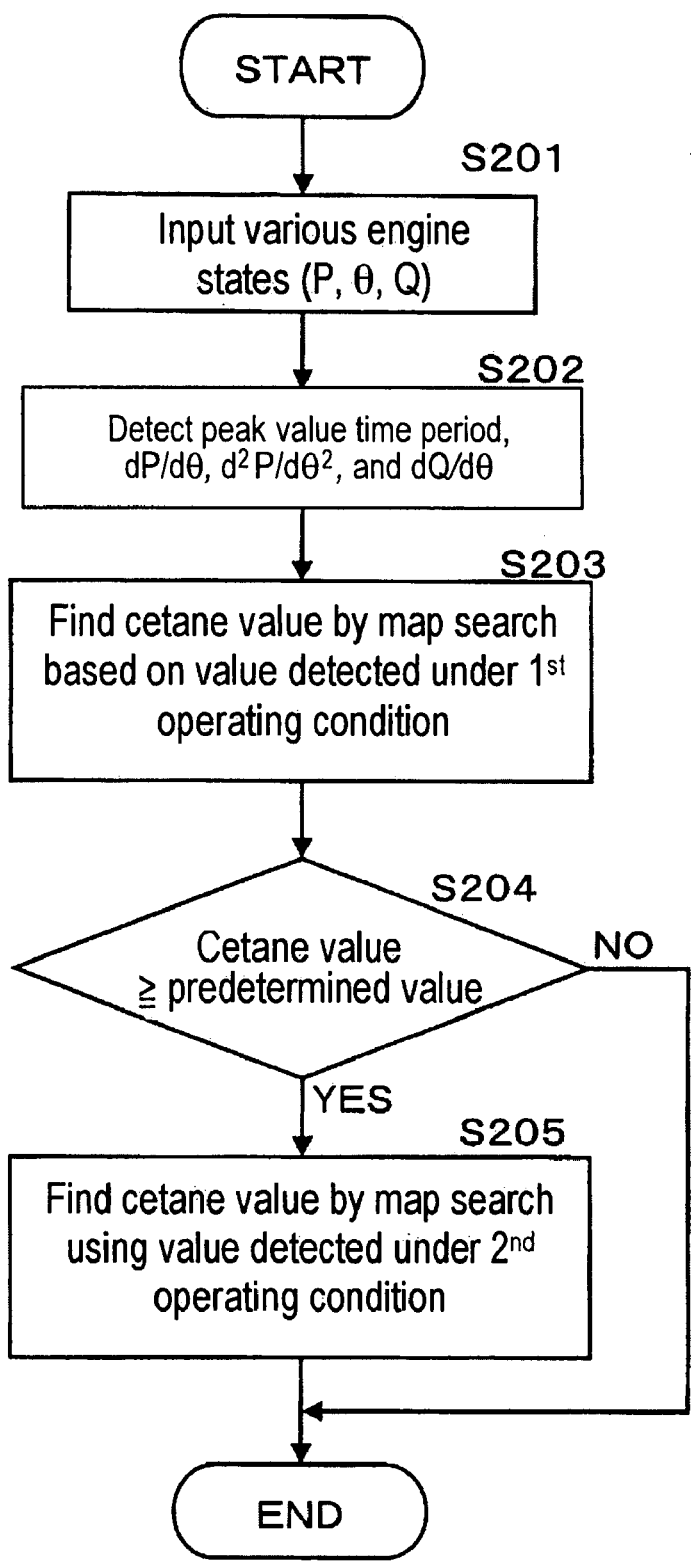
FIG. 10 is a flow chart illustrating a routine for determining the cetane value of the fuel in the second embodiment.
Figure 11:
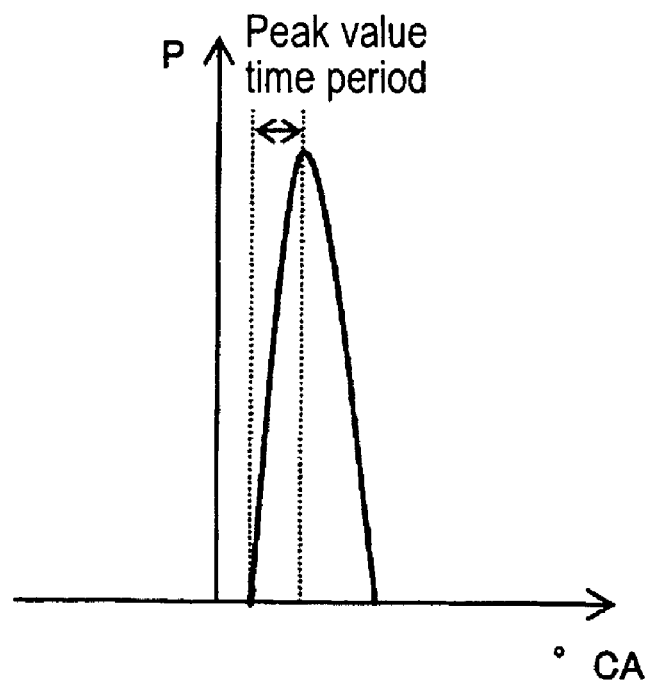
FIG. 11 is a graph illustrating the variability of the compression force used in the first embodiment.
Figure 12:
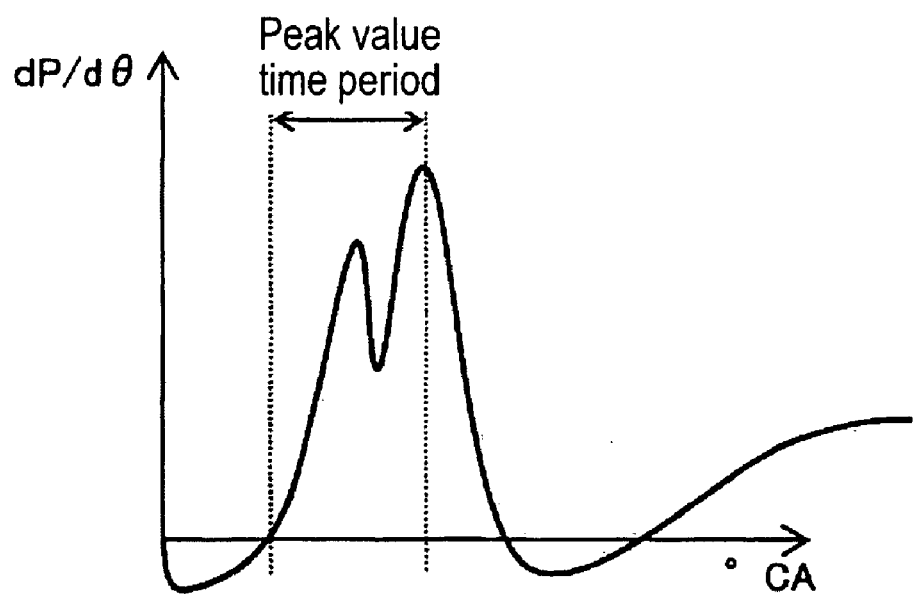
FIG. 12 is a graph illustrating the variability of the pressure change ratio that may be used in the first embodiment.
Figure 13:
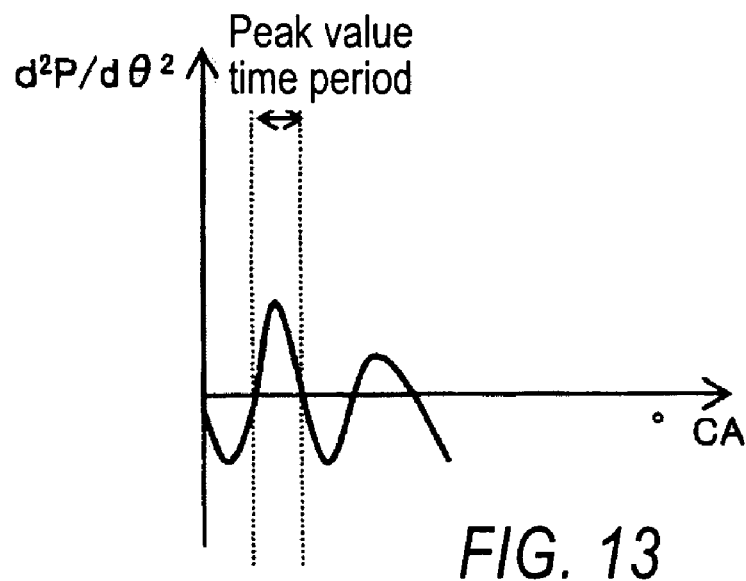
FIG. 13 is a graph illustrating the variability of the derivative of the pressure change ratio that may be used in the first embodiment.
Figure 14:
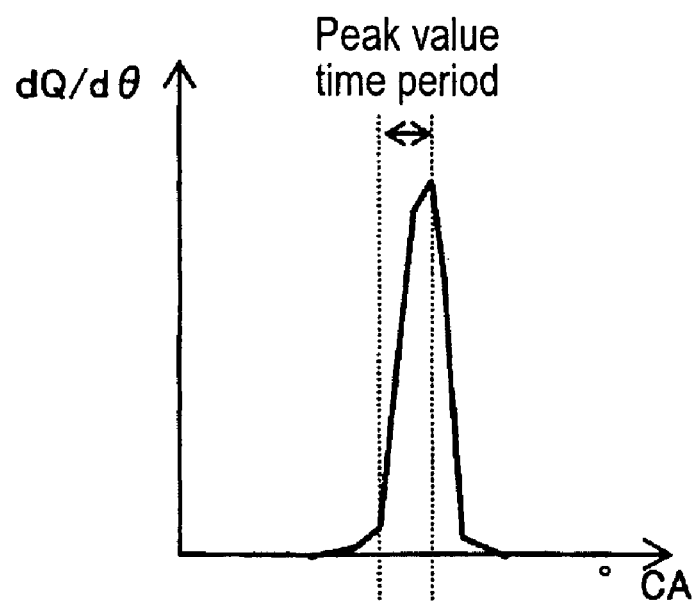
FIG. 14 is a graph illustrating the variability of the heat value change ratio that may be used in the first embodiment.

The process flow of fuel cetane value determination in a second embodiment that utilizes the peak value time period (defined above) to represent the rapidness of combustion is shown in FIG. 10.

As can be readily seen by comparing the flow charts of FIG. 2 and 10, Step S201 and Step S204 of the flow chart of FIG. 10 is identical to Step S101 and Step S104 of the flow chart of FIG. 2. To explain only the difference from the first embodiment in FIG. 2, in the second embodiment, the peak value time period is the time it takes for the respective parameters to reach their peak values after combustion begins. For example, the peak value time periods for either the piston force, pressure change ratio $dP/d\theta$, derivative $d^2P/d\theta^2$ of the pressure change ratio, or the heat value change ratio $dQ/d\theta$ shown in FIGS. 11-14 are computed as the rapidness of combustion in Step S202, and cetane values are computed according to the characteristics under the first and second operating conditions based on the aforementioned respective values in Step S203 and Step S205.

Although the pressure P inside the combustion chamber is used as the combustion status parameter in the aforementioned first and the second embodiments, a change of the rotational speed can be computed from the value of the detected engine rotational speed to use the rotational speed change as the rapidness of combustion.

Figure 15:
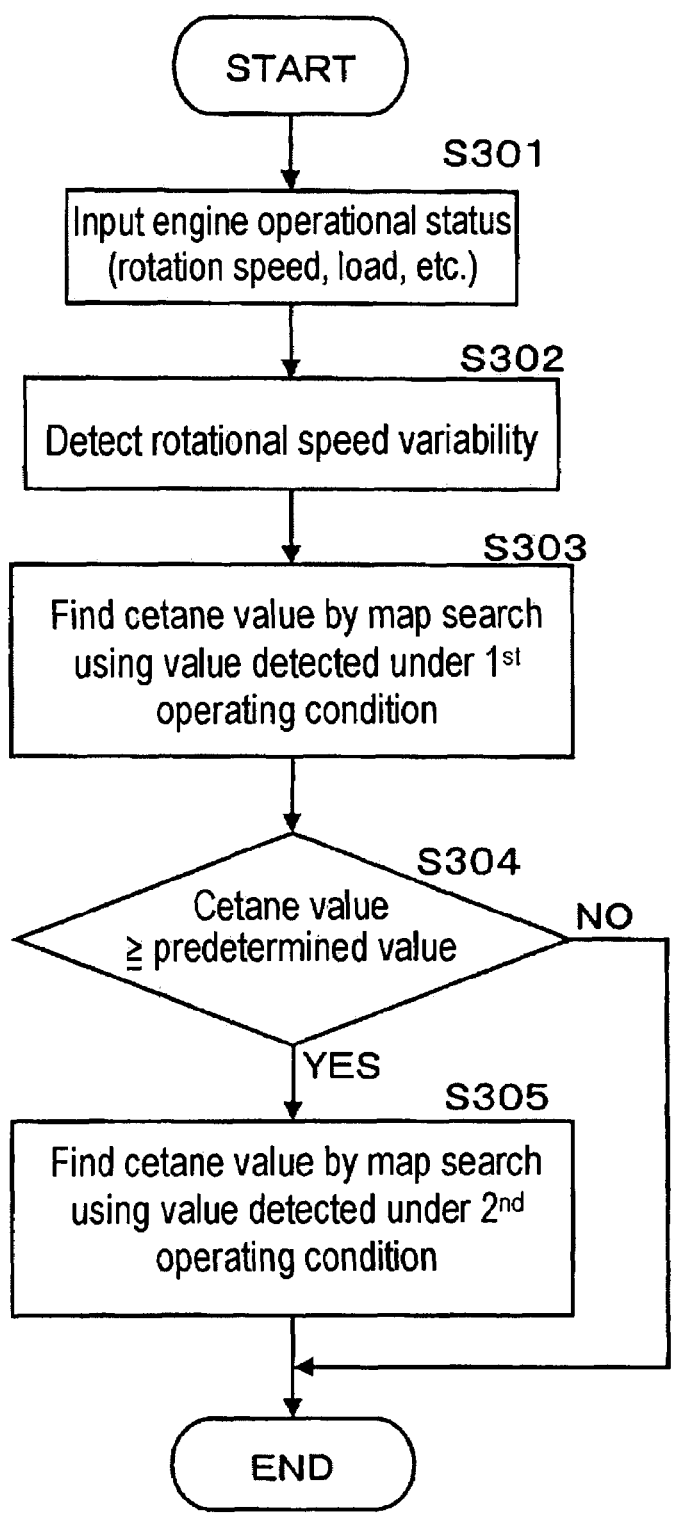
FIG. 15 is a flow chart illustrating the routine for finding the cetane value of the fuel in a third embodiment.

The process flow for the fuel cetane value determination in a third embodiment that utilizes the engine rotational speed change as the rapidness of combustion is shown in FIG. 15.

Similarly, to explain only the differences from the embodiment shown in FIG. 2, in this case, engine rotational speed Ne and load (fuel injection amount, for example) T are detected as engine operational status parameters in Step S301, and change ΔNe in engine rotational speed Ne is determined (computed) as the rapidness of combustion in Step S302.

Figure 16:
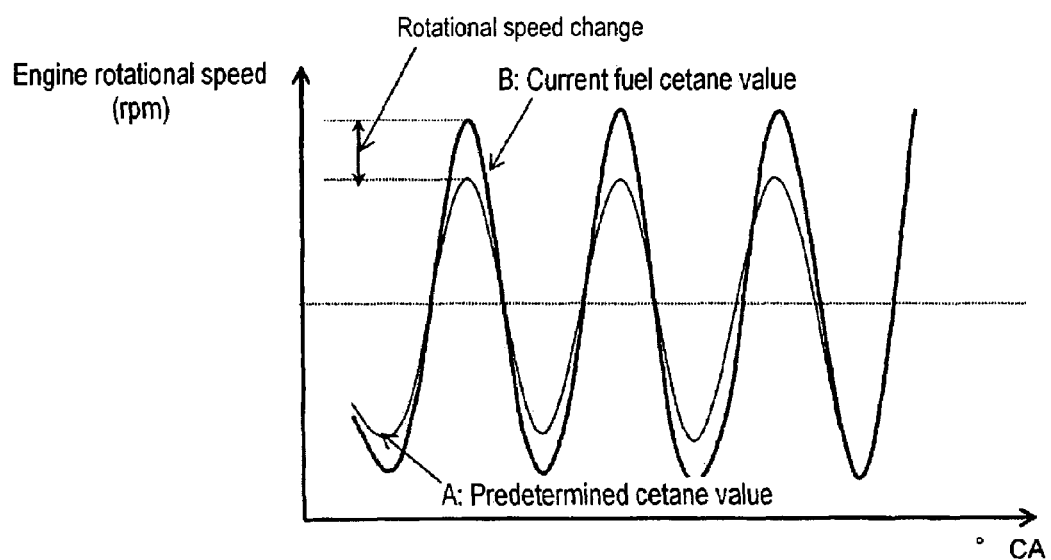
FIG. 16 is a graph illustrating the variability of engine speed that may be used in the third embodiment.

More specifically, as shown in FIG. 16, the change in rotational speed ΔDNe, which is defined based on the deviation (=ΔNe maxr−ΔNe max0) between a peak change value ΔNe max0 of a rotational speed characteristic A obtained when operated using a fuel with a predetermined cetane value, and peak change value ΔNe maxr of the current rotational speed characteristic B is computed as the rapidness of combustion.

Figure 17:
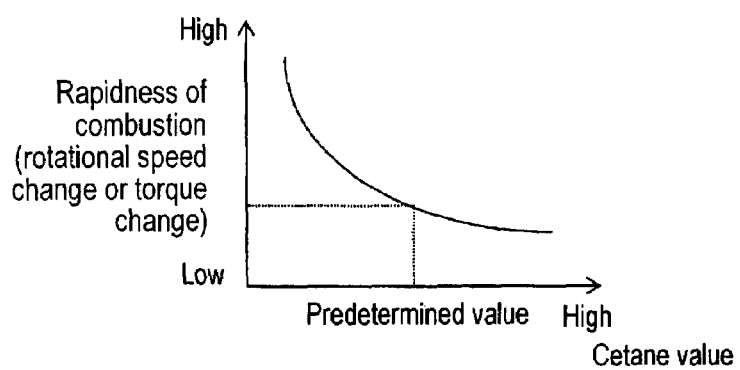
FIG. 17 is a graph illustrating the relationship between the cetane value and rapidness of combustion under the first operating condition that may be used in the third and the fourth embodiments.

A cetane value is then computed in Step S303, from the characteristic data in a map obtained using the rotational speed change ΔDNe as the rapidness of combustion under the first operating condition (high engine rotational speed at middle-high load or idling/low load) shown in FIG. 17. From Step S303, the process proceeds to Step S304 where the cetane value is compared to a predetermined value. If the cetane value is greater than or equal to the predetermined value, then the process proceeds to Step S305. If the cetane value is less than the predetermined value, then the process ends.

Figure 18:
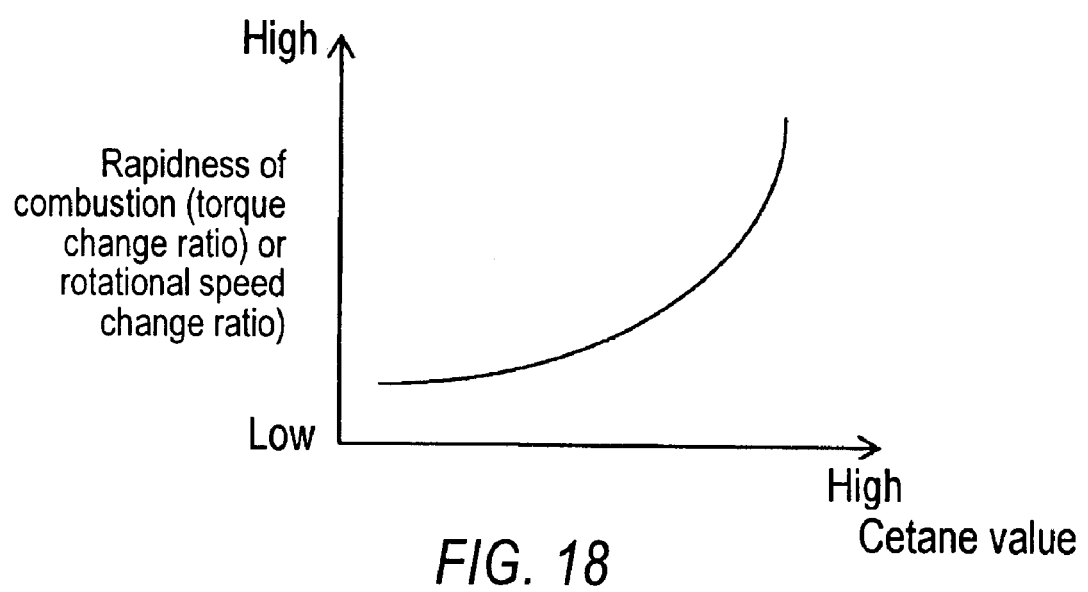
FIG. 18 is a graph illustrating the relationship between the cetane value and the rapidness of combustion under the second operating condition that may be used in the third and the fourth embodiments.

In addition, in Step S305, a cetane value is similarly computed from the characteristic data in a map obtained using the rotational speed change ΔDNe as the rapidness of combustion under the second operating condition (at idling/low load/low engine rotational speed) shown in FIG. 18.

Furthermore, change of the engine torque can also be used as the combustion status parameter for detecting the rapidness of combustion in place of the change of engine rotational speed Ne.

Figure 19:
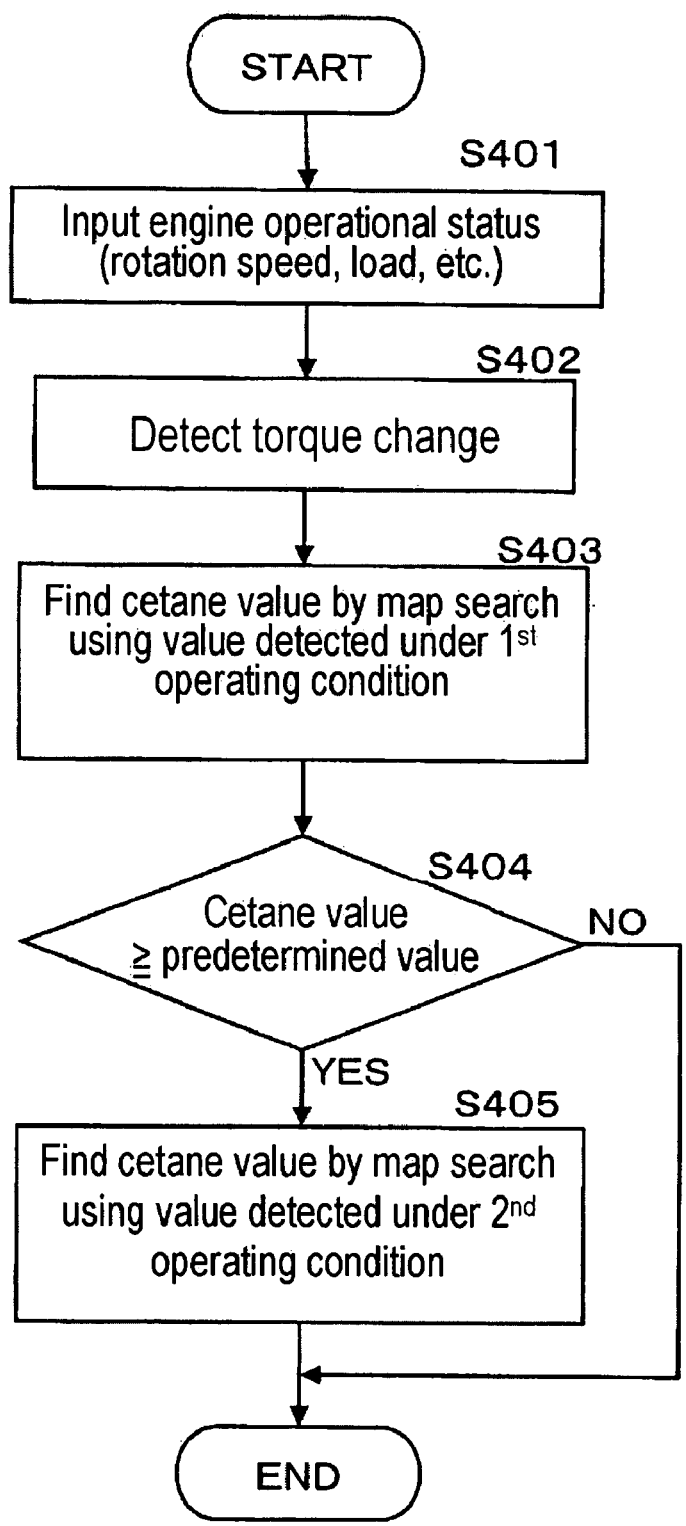
FIG. 19 is a flow chart illustrating the routine for finding the cetane value of the fuel in the fourth embodiment.

The process flow of fuel cetane value determination in a fourth embodiment that uses the change of the engine torque as the rapidness of combustion is shown in FIG. 19.

Similarly, to explain only the differences from the embodiment shown in FIG. 2, the engine operational status detected in Step S401 includes engine torque Te in addition to the engine rotational speed and load.

The engine torque detected in the fourth embodiment is used as a parameter for obtaining torque change, and torque change cannot be obtained using a parameter that indicates a smooth engine torque, for example, a fuel injection amount.

More specifically, as indicated by the broken line in FIG. 1, when a strain gauge 51 for detecting a strain of the engine output shaft is provided, the engine torque that corresponds to the strain of the engine output shaft can be detected highly accurately.

In Step S402, change ΔTe of engine torque Te is determined (computed) as the rapidness of combustion.

Figure 20:
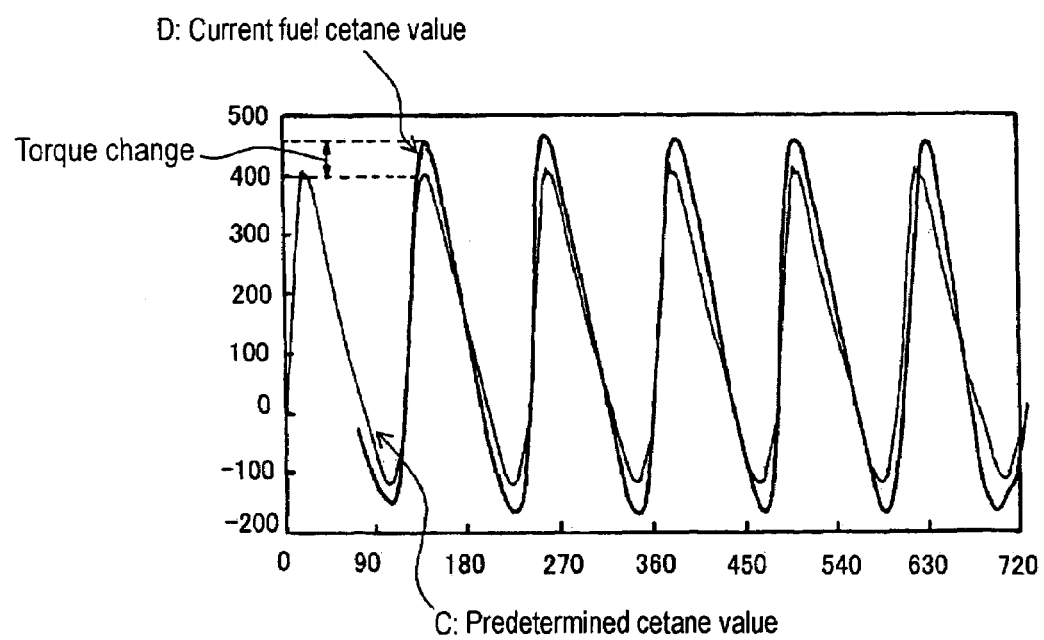
FIG. 20 is a graph illustrating the variability of engine torque used in the fourth embodiment.

More specifically, as shown in FIG. 20, torque change ΔDTe defined by the deviation (=ΔTe maxr−ΔTe max0) between a peak change value ΔTe max0 of the torque characteristic C obtained when operated using a fuel with a predetermined cetane value, and a peak change value ΔTe maxr of the current torque characteristic D is determined as the rapidness of combustion.

Then, in Step S403, a cetane value is computed from the characteristic data in the map obtained using the torque change ΔDTe as the rapidness of combustion under the first operating condition (at middle-high load condition or idling/low load/high engine rotational speed) shown in FIG. 17. From Step S403, the process proceeds to Step S404 where the cetane value is compared to a predetermined value. If the cetane value is greater than or equal to the predetermined value, then the process proceeds to Step S405. If the cetane value is less than the predetermined value, then the process ends.

In addition, in Step S405, a cetane value is similarly computed from the characteristic data in the map obtained using torque change ΔTNe as the rapidness of combustion under the second operating condition (at idling/low load/low engine rotational speed) shown in FIG. 18.

As shown in the aforementioned embodiments, according to the various embodiments of present invention, because the cetane value is obtained from data correlating the cetane value and the rapidness of combustion that differ under the first operating condition (at middle-high load or idling/low load/high engine rotational speed) and under the second operating condition (at idling/low load/low engine rotational speed), the cetane value can be detected correctly according to a given operating condition.

In addition, according to the aforementioned embodiments, when a correlational data map between the cetane values and the rapidness of combustion as obtained under first and second operating conditions is used, the cetane value of a high cetane fuel, for which the cetane value is likely to show little difference under the middle-high load condition and under the idling/low load/high engine rotational speed condition, can be detected highly accurately. On the other hand, a low cetane fuel, for which the cetane value is likely to show little difference under the idling/low load/low engine rotational speed condition, can also be detected highly accurately.

In addition, according to the configuration in the first and the second embodiments, wherein the pressure inside the combustion chamber is used as a combustion status parameter for obtaining the rapidness of combustion, the cetane value can be detected using a sensor, such as an in-cylinder pressure sensor, which is positioned inside the engine.

In addition, in the third embodiment, where rotational speed change is used as the rapidness of combustion, the cetane value can be detected highly accurately using a sensor, such as a crank angle sensor, which is used inside the engine.

In addition, in the fourth embodiment, where engine torque change is used as the rapidness of combustion, because a detector, such as a strain gauge, that can generate a direct output is used for detection, the cetane value can be detected highly accurately.

The preceding description has been presented only to illustrate and describe exemplary embodiments of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A fuel cetane determination device for an engine, comprising a controller that is arranged and configured to:
   determine a rapidness of combustion based on a parameter relating to a combustion state of an engine;
   determine the cetane value of the fuel in use by the engine based on the rapidness of combustion from a correlation between the rapidness of combustion and the cetane value when the engine is in a first operating condition; and
   determine the cetane value of the fuel in use by the engine base on the rapidness of combustion from a correlation between the rapidness of combustion and the cetane value when the engine is in a second operating condition;

wherein the correlation for the second operating condition has a different characteristic tendency from the correlation for the first operating condition.

2. The fuel cetane determination device as claimed in claim 1, wherein:
the correlation for the first operating condition has a characteristic that the rapidness of combustion decreases as the cetane value increases; and
the correlation for the second operating condition has a characteristic that the rapidness of combustion increases as the cetane value increases.

3. The fuel cetane determination device as claimed in claim 1, wherein:
when the cetane value obtained under the first operating condition is greater than a predetermined cetane value, the cetane value is determined in the second operating condition.

4. The fuel cetane determination device as claimed in claim 1, wherein:
when the cetane value obtained in the second operating condition is less than a predetermined cetane value, the cetane value is determined in the first operating condition.

5. The fuel cetane determination device as claimed in claim 1, wherein:
the first operating condition is a high load condition, or a low load and high engine speed condition.

6. The fuel cetane determination device as claimed in claim 1, wherein:
the second operating condition is a low load and low engine speed condition.

7. The fuel cetane determination device as claimed in claim 1, wherein:
the parameter relating to the combustion state of the engine is combustion pressure inside a combustion chamber of the engine.

8. The fuel cetane determination device as claimed in claim 7, wherein:
the rapidness of combustion is determined from at least one of a force on the piston due to combustion that is derived from a combustion pressure P, a pressure change ratio $dP/d\theta$, where $\theta$ is a crank angle, a derivative of the pressure change ratio $d^2P/d\theta^2$, or a heat value change ratio $dQ/d\theta$, where Q is a heat value of combustion.

9. The fuel cetane determination device as claimed in claim 8, wherein:
the rapidness of combustion is a peak value of the force on the piston due to combustion, pressure change ratio $dP/d\theta$, the derivative of the pressure change ratio $d^2P/d\theta^2$, or the heat value change ratio $dQ/d\theta$.

10. The fuel cetane determination device as claimed in claim 9, wherein:
the rapidness of combustion increases as the peak value increases, and decreases as the peak value decreases.

11. The fuel cetane determination device as claimed in claim 7, wherein:
the rapidness of combustion is a time that a combustion pressure reaches a peak value after combustion begins.

12. The fuel cetane determination device as claimed in claim 11, wherein:
the rapidness of combustion increases as the time to reach the peak value becomes shorter, and decreases as the time to reach the peak value becomes longer.

13. The fuel cetane determination device as claimed in claim 1, wherein:
the parameter relating to the combustion state of the engine is engine speed.

14. The fuel cetane determination device as claimed in claim 13, wherein:
the parameter relating to the combustion state of the engine is a change ratio of engine speed.

15. The fuel cetane determination device as claimed in claim 1, wherein:
the parameter relating to the combustion state of the engine is an engine torque.

16. The fuel cetane determination device as claimed in claim 15, wherein:
the parameter relating to the combustion state of the engine is a change ratio of the engine torque.

17. The fuel cetane determination device as claimed in claim 15, further comprising a strain gauge for detecting the strain of an engine output shaft and wherein engine torque is derived from the detected strain of the engine output shaft.

18. A method for determining the cetane value of a fuel used by an engine, comprising:
determining a rapidness of combustion based on a parameter relating to an engine combustion state;
determining the cetane value of fuel in use based on the rapidness of combustion from a correlation between the rapidness of combustion and cetane value when the engine is in a first operating condition and when the engine is in a second operating condition, wherein the correlation for the second operating condition has a different characteristic tendency from the correlation for the first operating condition.

19. A device for determining fuel cetane value use in an engine, comprising:
means for determining a rapidness of combustion based on a parameter relating to an engine combustion state;
means for determining the cetane value of fuel in use based on the rapidness of combustion from a correlation between the rapidness of combustion and cetane value when the engine is in a first operating condition and when the engine is in a second operating condition, wherein the correlation for the second operating condition has a different characteristic tendency from the correlation for the first operating condition.

20. A device for determining the cetane value of a fuel used by an engine, comprising:
a sensor for detecting information relating to a combustion state of an engine;
a controller that receives information from the sensor, wherein the controller determines the rapidness of combustion based on the detected information;
wherein the controller calculates the cetane value of fuel in use by the engine based on rapidness of combustion characteristic and cetane value when the engine is in a first operating condition, and
wherein the controller calculates the cetane value of the fuel in use by the engine based on the rapidness of combustion from a correlation between the rapidness of combustion and the cetane value when the engine is in a second operating condition; wherein the correlation used form the second operating condition is different from that used for the first operating condition.

* * * * *